US009327650B2

(12) United States Patent  (10) Patent No.: US 9,327,650 B2
Babian  (45) Date of Patent: May 3, 2016

(54) CUP HOLDER ASSEMBLY WITH CANTILEVERED SUPPORT (71) Applicant: Toyota Motor Engineering & Manufacturing North America, Inc., Erlanger, KY (US)

(72) Inventor: Philip J. Babian, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/447,129

(22) Filed: Jul. 30, 2014

(65) Prior Publication Data

US 2016/0031378 A1 Feb. 4, 2016

(51) Int. Cl.
*B60R 7/06* (2006.01)

(52) U.S. Cl.
CPC ........................................ *B60R 7/06* (2013.01)

(58) Field of Classification Search
CPC ...... B60N 3/102; B60N 3/101; B60N 2/4686; B60N 3/106; B60R 7/04; B60R 11/00; A45C 11/00; Y10S 224/926; H02K 5/148
USPC .................. 296/37.12, 24.34, 37.8; 224/926; 268/311.2
See application file for complete search history.

(56) References Cited

U.S. PATENT DOCUMENTS

| | | | |
|---|---|---|---|
| 4,256,281 A | 3/1981 | Harris et al. | |
| 4,417,764 A * | 11/1983 | Marcus | B60N 3/102 108/44 |
| 4,953,771 A * | 9/1990 | Fischer | B60N 3/102 108/44 |
| 4,981,277 A | 1/1991 | Elwell | |
| 5,106,143 A | 4/1992 | Soeters | |
| 5,170,980 A * | 12/1992 | Burrows | B60N 3/101 108/25 |
| 5,171,061 A * | 12/1992 | Marcusen | B60N 2/4686 248/311.2 |
| 5,195,711 A * | 3/1993 | Miller | A47C 7/70 224/275 |
| 5,248,183 A * | 9/1993 | Gignac | B60N 3/102 248/311.2 |
| 5,284,314 A * | 2/1994 | Misaras | B60N 2/4686 224/549 |
| 5,289,962 A * | 3/1994 | Tull | B60N 3/102 211/41.2 |
| 5,318,343 A * | 6/1994 | Spykerman | B60N 3/106 297/188.16 |
| 5,330,146 A * | 7/1994 | Spykerman | B60N 3/102 224/281 |
| 5,379,978 A * | 1/1995 | Patel | B60N 3/102 224/281 |
| 5,524,958 A * | 6/1996 | Wieczorek | A47C 7/70 297/188.17 |
| 5,527,008 A * | 6/1996 | Schutter | B60N 3/106 224/926 |

(Continued)

*Primary Examiner* — Kiran B Patel
(74) *Attorney, Agent, or Firm* — Dinsmore & Shohl LLP (57) ABSTRACT

A cup holder assembly and an instrument panel assembly for use in an automotive vehicle. The cup holder assembly includes a catch configured to assist with the blind installation of the cup holder assembly into an opening of the instrument panel. The catch is further configured to provide cantilevered support so as to help maintain the cup holder in a fixed relationship when a cup is mounted therein. The catch engages an elongated portion of a reinforcement bracket so as to limit the advancement of the cup holder assembly during installation.

6 Claims, 7 Drawing Sheets

(56) References Cited

U.S. PATENT DOCUMENTS

| | | | |
|---|---|---|---|
| 5,618,018 A * | 4/1997 | Baniak | B60N 3/102 224/483 |
| 5,628,486 A * | 5/1997 | Rossman | B60N 3/102 224/926 |
| 5,800,011 A * | 9/1998 | Spykerman | B60N 3/106 248/311.2 |
| 5,857,633 A * | 1/1999 | Pelchat, II | B60N 3/102 224/926 |
| 5,876,007 A * | 3/1999 | Lancaster | B60N 3/102 224/281 |
| 5,944,240 A * | 8/1999 | Honma | B60N 3/102 224/281 |
| 5,988,579 A * | 11/1999 | Moner, Jr. | B60N 3/102 224/926 |
| 6,250,527 B1 * | 6/2001 | Mizue | B60N 3/102 224/281 |
| 6,276,740 B1 | 8/2001 | Mellor et al. | |
| 6,349,913 B1 * | 2/2002 | Jankowski | B60N 3/108 224/281 |
| 6,361,008 B1 | 3/2002 | Gravenstreter | |
| 6,464,187 B1 * | 10/2002 | Bieck | B60N 3/102 224/926 |
| 6,652,024 B2 | 11/2003 | Prasatek | |
| 6,779,769 B1 * | 8/2004 | York | B60N 3/102 224/926 |
| 6,837,408 B2 * | 1/2005 | Dieringer | B60N 3/102 224/281 |
| 6,971,618 B2 * | 12/2005 | Moyer | B29C 45/0081 248/311.2 |
| 7,513,550 B1 | 4/2009 | Abro et al. | |
| 7,568,601 B2 * | 8/2009 | Kogami | B60N 3/102 220/345.1 |
| 7,624,960 B2 | 12/2009 | Saenz | |
| 7,658,357 B2 | 2/2010 | Babian | |
| 8,020,913 B2 | 9/2011 | Kwolek | |
| 8,100,463 B2 | 1/2012 | Penner et al. | |
| 8,336,841 B2 * | 12/2012 | Ercolano | B60N 3/102 220/737 |
| 8,376,444 B2 | 2/2013 | Scheib et al. | |
| 8,517,447 B2 | 8/2013 | Biggs | |
| 8,602,479 B2 | 12/2013 | Kuwabara et al. | |
| 8,651,546 B2 | 2/2014 | Vasko et al. | |
| 8,701,819 B2 | 4/2014 | Porcs | |
| 9,010,599 B2 * | 4/2015 | Shindo | B60N 3/102 224/483 |
| 9,211,828 B2 * | 12/2015 | Masuda | B60N 3/102 |
| 2002/0033656 A1 * | 3/2002 | Shimajiri | B60N 3/102 312/332 |
| 2002/0171018 A1 * | 11/2002 | Harada | B60N 3/102 248/311.2 |
| 2003/0209643 A1 * | 11/2003 | Choi | B60N 3/102 248/311.2 |
| 2004/0251746 A1 * | 12/2004 | Ichimaru | B60N 3/102 307/116 |
| 2006/0038101 A1 * | 2/2006 | Oana | B60N 3/102 248/311.2 |
| 2006/0060741 A1 * | 3/2006 | Yanagita | B60N 3/106 248/311.2 |
| 2006/0065802 A1 * | 3/2006 | Harada | B60N 2/34 248/311.2 |
| 2008/0049949 A1 * | 2/2008 | Snider | H04B 1/082 381/86 |
| 2008/0265605 A1 * | 10/2008 | Biggs | B60N 3/102 296/37.8 |
| 2009/0322103 A1 * | 12/2009 | Park | B60R 7/06 292/57 |
| 2012/0119534 A1 * | 5/2012 | Shimozaki | B60N 3/102 296/24.34 |
| 2013/0112831 A1 * | 5/2013 | Kong | B60N 2/4686 248/311.2 |
| 2013/0126691 A1 * | 5/2013 | Miklas | B60N 3/102 248/311.2 |
| 2013/0257076 A1 | 10/2013 | Abro et al. | |

* cited by examiner

FIG. 8

CUP HOLDER ASSEMBLY WITH CANTILEVERED SUPPORT

TECHNICAL FIELD

A cup holder assembly having a cantilevered support and configured to assist in the blind installation of the cup holder to an instrument panel assembly is provided.

BACKGROUND OF THE INVENTION

Figure 1:
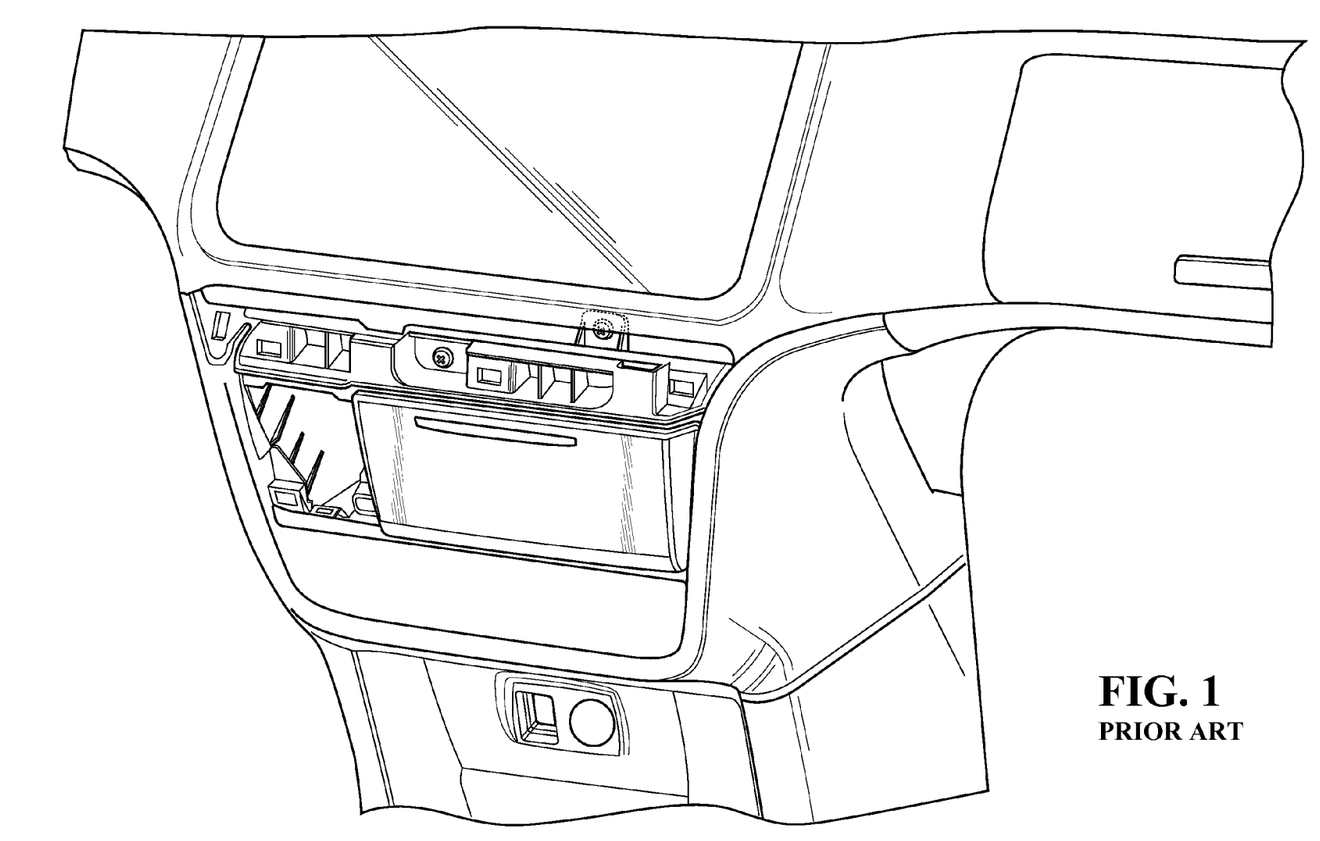
FIG. 1 is a perspective view of a cup holder assembly of the prior art.
Figure 2:
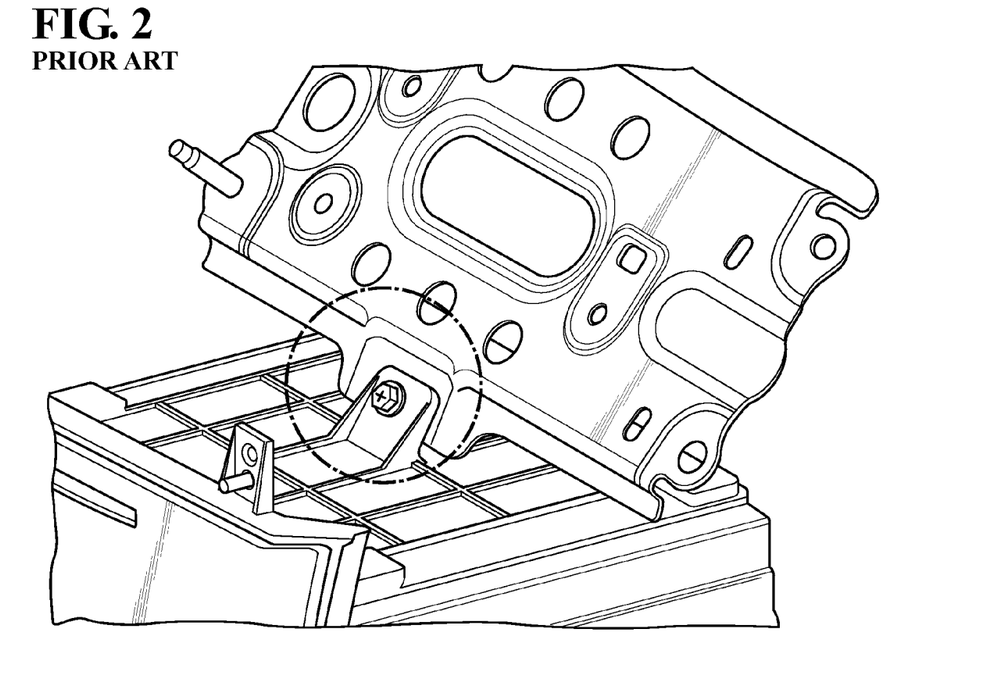
FIG. 2 is a perspective view showing the cup holder assembly of the prior art fastened to the reinforcement bracket.
Figure 3:
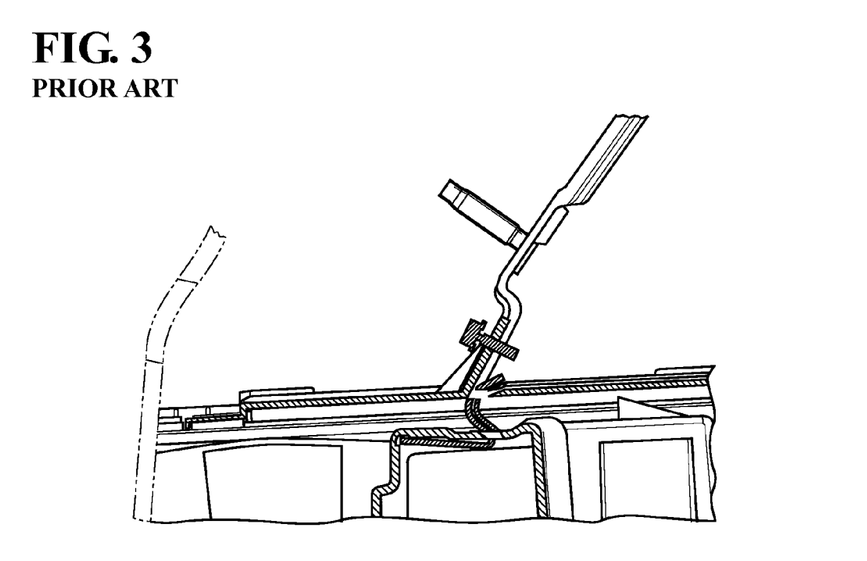
FIG. 3 is cross-sectional view of the cup holder assembly of FIG. 1.
Figure 4:
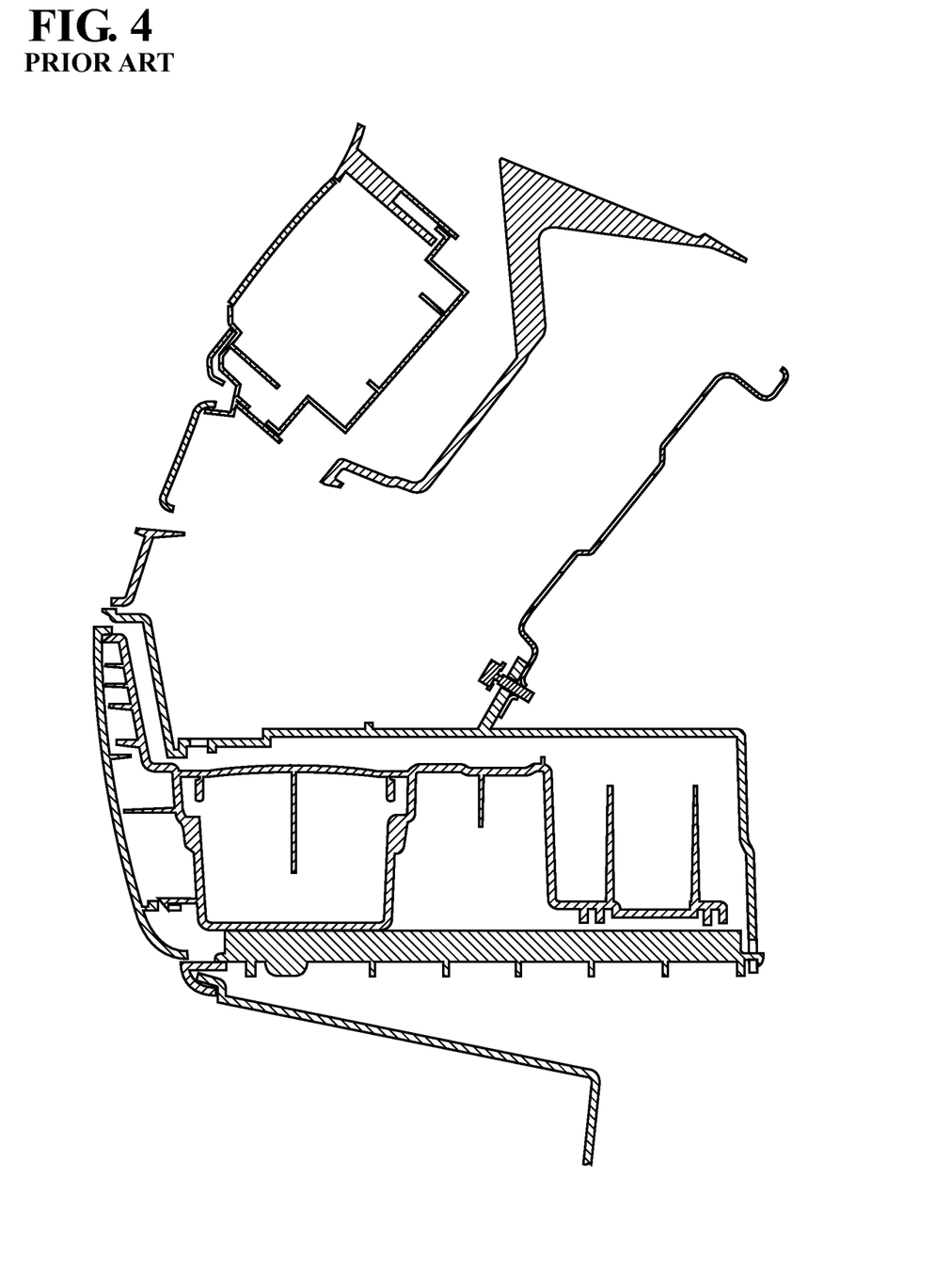
FIG. 4 is a cross-sectional view of the instrument panel assembly of the prior art, depicting the tight space in which an installer must fasten the cup holder assembly to the reinforcement bracket.

Automotive vehicles may include a cup holder. The cup holder may be mounted to an instrument panel assembly and may be housed behind an exterior surface of the instrument panel. The cup holder assembly may be configured to eject a cup holder from the housing. The housing is mounted to the instrument panel assembly utilizing mechanical fasteners. For instance, a screw shot may be applied to a mounting structure of the cup holder assembly so as to attach the cup holder assembly to a reinforcement bracket, as shown in FIGS. 1-4. With reference specifically to FIG. 4, the space in which the installer fastens the cup holder to the reinforcement bracket is relatively tight. However, the application of the screw shot to fix the cup holder assembly to the reinforcement bracket is desired as the screw shot provides cantilevered support for a cup holder holding a cup.

In certain vehicle configurations wherein design changes provide structure adjacent an opening of the instrument panel where the cup holder assembly is mounted, the cup holder assembly must be installed blindly; that is, the installer cannot visually see where the mount is attached and thus must have to use tactile response in order to ensure that the cup holder is secured properly prior to fastening the cup holder to the reinforcement bracket. Further, application of a screw shot attaching the mount to the reinforcement bracket is difficult. Accordingly, it remains desirable to have a cup holder assembly having a mount configured to assist with the blind installation of the cup holder. It further remains desirable to have a cup holder assembly which includes a cantilevered support so as to support the cup holder along a generally horizontal plane and to counteract the weight of a cup when the cup holders are extended and engaged.

SUMMARY OF THE INVENTION

A cup holder assembly and an instrument panel assembly are provided. The cup holder assembly includes a housing. The housing is configured to store the cup holder. The housing may further include an eject mechanism configured to eject the cup holder from the housing so as to place the cup holder in a use position.

The cup holder assembly includes a mount. The mount is disposed on a top surface of the housing. The mount includes a catch configured to abut against a portion of the instrument panel reinforcement bracket. The catch limits the advancement of the cup holder assembly during installation of the cup holder assembly to the instrument panel so as to facilitate the blind installation of the cup holder assembly to the instrument panel.

The catch may include an inner surface having a C-shaped cross section configured to engage an elongated member having an end portion with a convex cross section which is configured to engage the catch. Thus, a bottom end of the elongated portion counteracts a cantilever action of the cup holder assembly when a cup is placed within the cup holder.

The instrument panel assembly includes an outer panel having an opening dimensioned to receive a cup holder assembly. An instrument panel reinforcement bracket transverses the width of the vehicle and is disposed behind the outer panel. The instrument panel reinforcement bracket includes an elongated portion.

The cup holder assembly includes a pair of side walls, a bottom wall, a top wall, and a back wall so as to define a storage compartment with a housing opening. A plurality of attachment structures are disposed adjacent the housing opening so as to provide structure for the attachment of the housing to the instrument panel. The top surface of the top wall includes a mount. The mount has a catch configured to engage the elongated portion. Thus, installation of the cup holder assembly to the instrument panel may be achieved by simply inserting the cup holder into the opening of the outer panel and engaging the catch with the elongated portion so as to position the cup holder properly wherein the user may attach the cup holder to the outer panel using known fastening devices.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings where like structure is indicated with like reference numerals and in which:

DETAILED DESCRIPTION OF THE PREFERRED EMBODIMENTS

The embodiments described herein generally relate to a cup holder assembly for use in an automotive vehicle. The cup holder assembly includes a catch configured to assist with the blind installation of the cup holder assembly into an opening of the instrument panel. The catch is further configured to provide cantilevered support so as to help maintain the cup holder in a fixed relationship when a cup is mounted therein.

The embodiments described herein also relate generally to an instrument panel assembly. The instrument panel assembly includes an opening configured to house a cup holder. The cup holder assembly includes a cup holder which may be extended outwardly with respect to the outer panel. The instrument panel assembly includes a reinforcement bracket having an elongated portion. The elongated portion is configured to abut against a catch of the cup holder assembly so as to limit the advancement of the cup holder assembly during installation.

Figure 5:
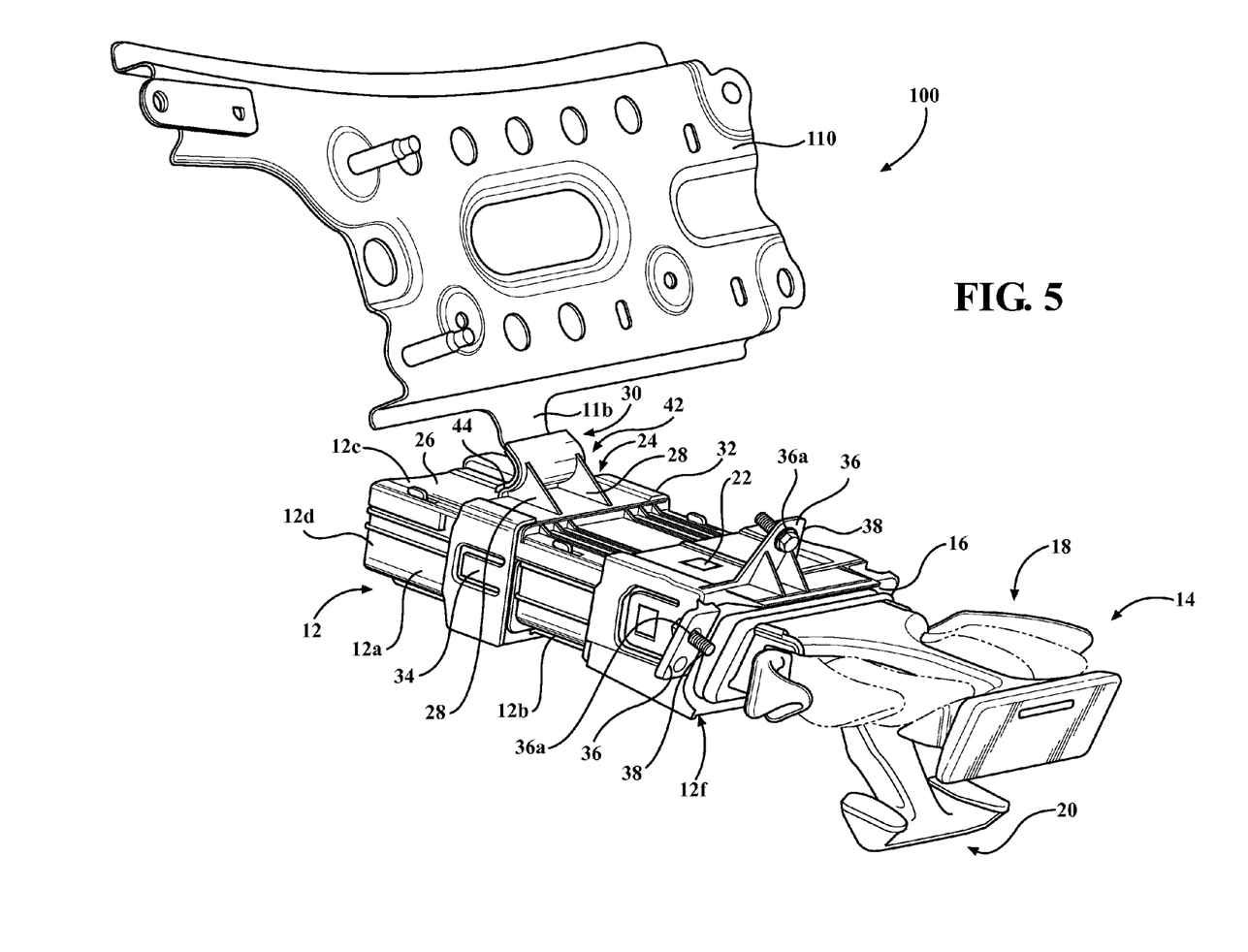
FIG. 5 is a perspective view of a cup holder assembly showing the catch engaged with the reinforcement bracket.
Figure 6:
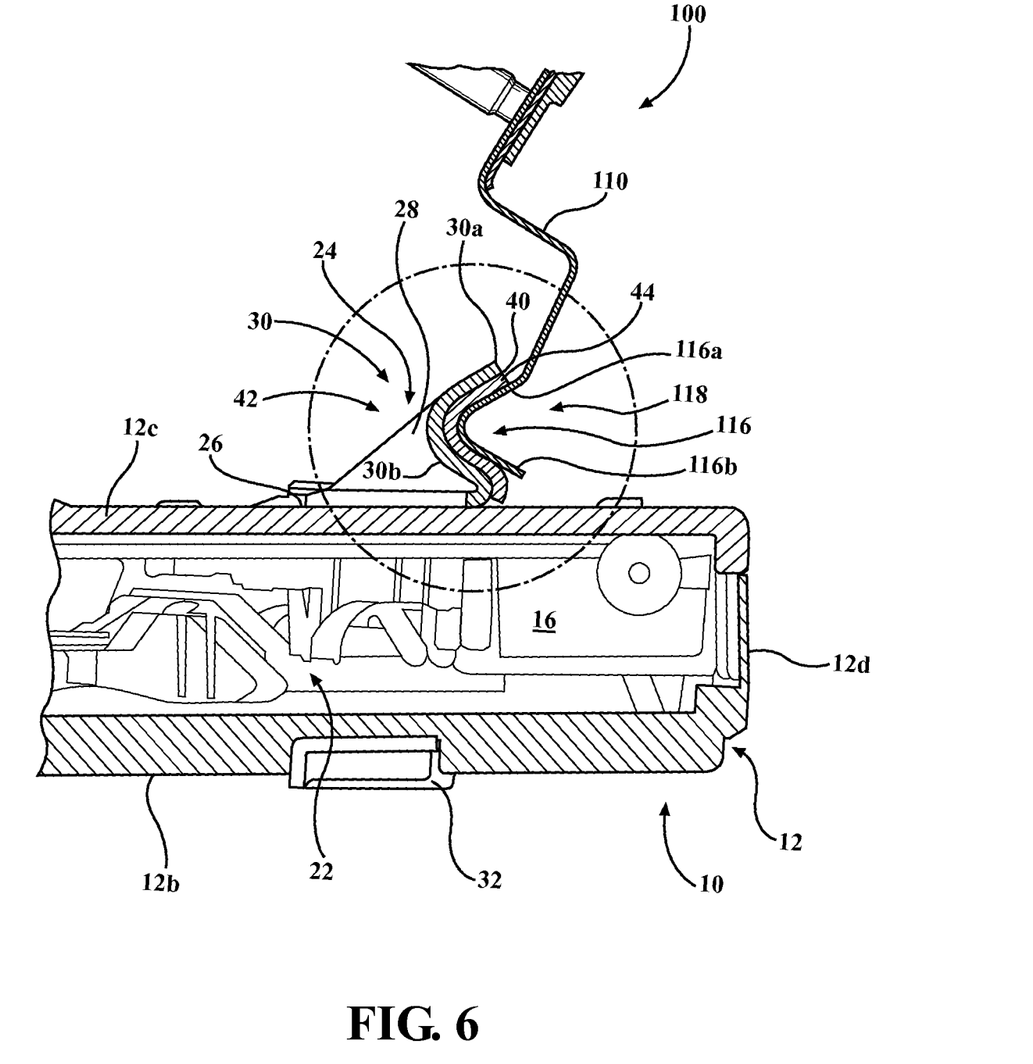
FIG. 6 is a cross-sectional view of the isolated area indicated in FIG. 5.
Figure 7:
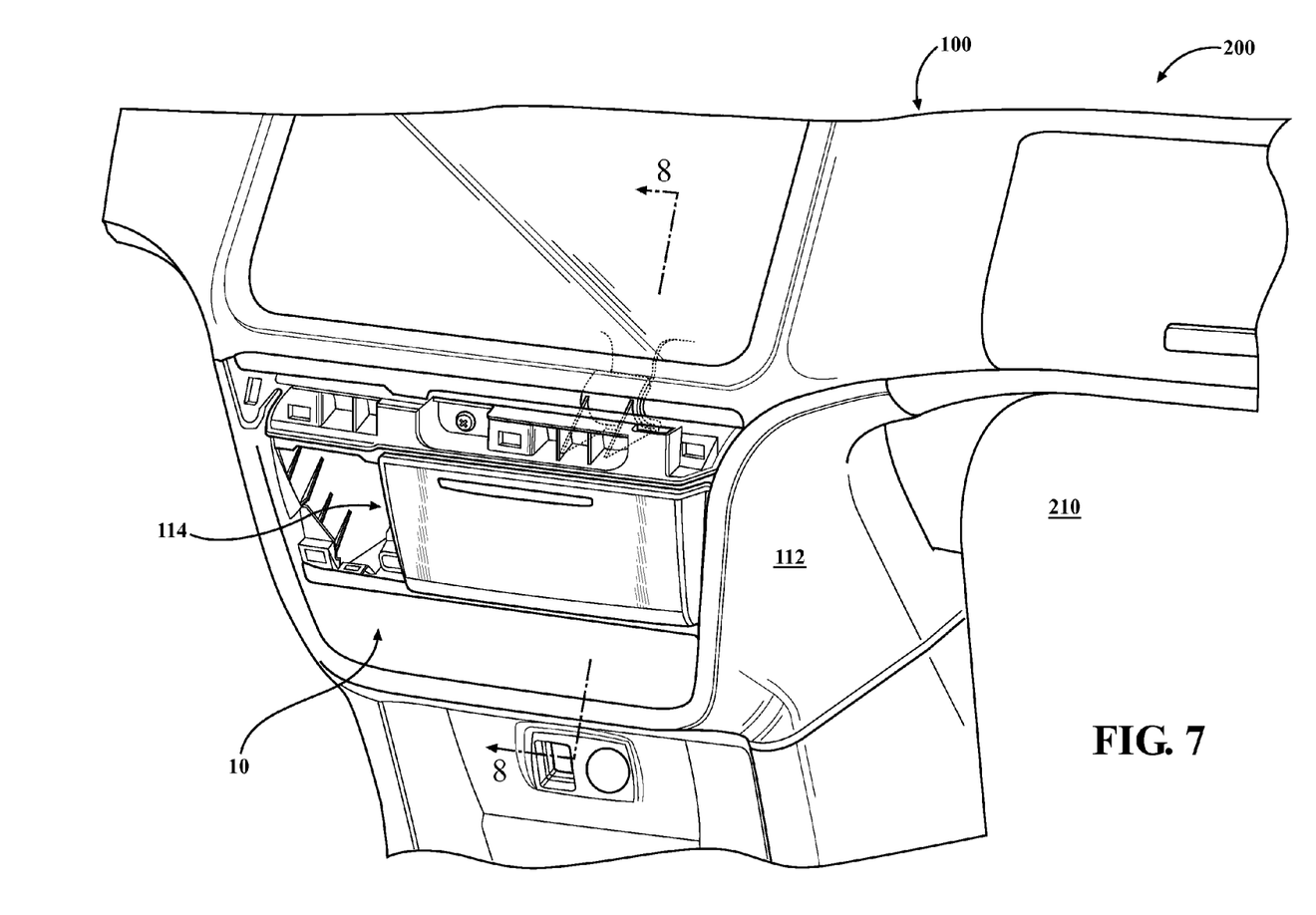
FIG. 7 is a perspective view showing the of the instrument panel assembly with the cup holder assembly installed.
Figure 8:
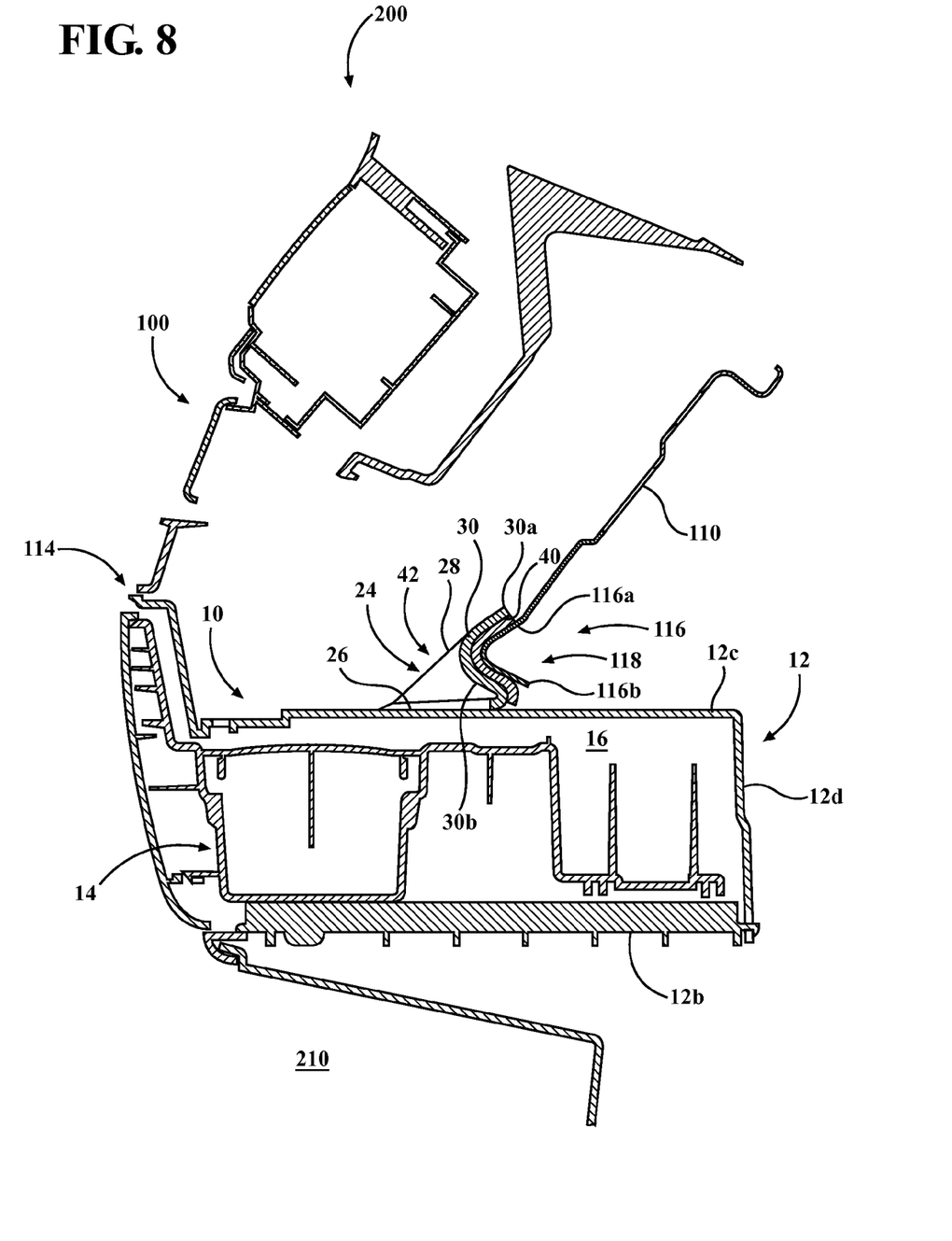
FIG. 8 is a cross-sectional view of FIG. 7 taken along lines 8-8.

With reference now to FIGS. 5-8, an embodiment of a cup holder assembly 10 for use in an instrument panel assembly 100 is provided. FIG. 5 is an isolated view of the cup holder assembly 10 engaged with a reinforcement bracket 110 of the instrument panel assembly 100. FIG. 6 is a cross-sectional view of FIG. 5 showing the engagement of the cup holder assembly 100 to the reinforcement bracket 110. FIG. 7 is a perspective view taken from the cabin space 210 of a vehicle 200 showing the instrument panel assembly 100. FIG. 8 is a cross-sectional view of FIG. 7 which shows how little space there is surrounding the reinforcement bracket 110 and the cup holder assembly 10.

With reference again to FIG. 5, a cup holder assembly 10 is provided. The cup holder assembly 10 includes a housing 12 and a cup holder 14. The housing 12 is formed by a pair of side walls 12a, a bottom wall 12b, a top wall 12c, and a back wall 12d so as to define a storage compartment 16 with a housing opening 12f. The storage compartment 16 is configured to hold the cup holder 14. The cup holder 14 is shown extended from the storage compartment 16 and positioned ready to receive a cup.

For illustrative purposes the cup holder 14 is shown as being configured to house two cups in a side-by-side relationship. The cup holder 14 includes a pair of radially extending arms 18 and a leg 20 which is biased downwardly so as to hold a respective cup therein. The radially extending arms 18 are biased inwardly by a biasing member (not shown) so as to enable the arms 18 to grip cups of different dimensions. The leg 20 is biased downwardly with respect to the arms 18 so as to deploy in a position to support the bottom of a cup (not shown) when the cup holder 14 is extended from the storage compartment 16.

The cup holder assembly 10 includes an eject mechanism 22 configured to extend the cup holder 14 out of the storage compartment 16 so as to expose the cup holder 14 for use. Eject mechanisms 22 currently known and used in the art may be adaptable for use herein. For example the eject mechanism 22 may include a biasing member (not shown), and a latch (not shown). The biasing member continuously urges the cup holder 14 out of the storage compartment 16. The latch may engage a portion of the cup holder 14 so as to retain the cup holder 14 within the storage compartment 16. A push of the cup holder 14 into the storage compartment 16 disengages the cup holder 14 from the latch, allowing the biasing member to push the cup holder 14 out of the storage compartment 16 into a position ready to accept a cup. Pushing the cup holder 14 back into the storage compartment 16 positions the latch to reengage the cup holder 14, securing the cup holder 14 within the storage compartment 16.

The cup holder assembly 10 includes a mount 24. The mount 24 is formed on the top surface 26 of the top wall 12c of the housing 12. The mount 24 may include a pair of ramp shaped planar members 28 extending generally vertically from a top surface 26 of the housing 12. Each of the ramp shaped planar member 28 is spaced apart from the other. The mount 24 includes a catch 30. The catch 30 is configured to engage a instrument panel reinforcement bracket 110 so as to limit the advancement of the cup holder assembly 10 when mounted within an opening 114 of the instrument panel assembly 100. In an exemplary embodiment, the reinforcement bracket 110 includes an elongated portion 116 extending generally downwardly. The catch 30 is configured to engage a distal end of the elongated portion 116 when the housing 12 is mounted within the opening 114.

The mount 24 may be formed on a sleeve 32. The sleeve 32 is dimensioned to engage the outer surface of the housing 12. The sleeve 32 may include attachment features 34 so as to provide a snap fit engagement to the outer surface of the housing 12.

The housing opening 12f may include a plurality of attachment structures 36. These attachment structures 36 are generally planar members having an opening 36a configured to receive a mechanical fastener 38 such as a screw. It should be appreciated that the attachment structure 36 is configured to align the housing opening 12f with the opening 114 of the outer panel 112 and fix the cup holder assembly 10 to the instrument panel assembly 100. FIG. 5 shows the cup holder 14 in the use position wherein the cup holder 14 is extended from the opening 114 of the housing 12.

With reference again to FIGS. 5, 6 and 8, the catch 30 may include an inner surface 40 having a C-shaped cross section 42 and is concave with respect to a distal end of the elongated portion 116 which is also C-shaped in cross section 118 and adapted to engage the inner surface 40 of the catch 30. Thus, a top portion 116a and a bottom portion 116b of the distal end of the elongated portion 116 are engaged with a respective top and bottom portion 30a, 30b of the catch 30. It should be appreciated that when the cup holder 14 is extended in the use position and cups are disposed therein that a cantilevered action is exerted which is countered by the C-shaped cross sections 42, 118 of a respective engagement of the catch 30 and the elongated portion 116.

The cup holder assembly 10 may include a liner 44. The liner 44 may be sandwiched in between an inner surface 40 of the catch 30 and the reinforcement bracket 110. More specifically, the liner 44 may be sandwiched between an inner surface 40 of the catch 30 and an outer surface of the elongated portion 116. The liner 44 may be formed of a material configured to absorb vibration and noise and dampen a torque. Such material illustratively includes felt; however, it should be appreciated that other materials may be used herein without deviating from the function of the liner 44.

With reference again to FIGS. 5, 7 and 8, an instrument panel assembly 100 disposed within a cabin space 210 of an automotive vehicle 200 is also provided herein. The instrument panel assembly 100 includes an outer panel 112 which is structurally supported in part by an instrument panel reinforcement bracket 110. The instrument panel reinforcement bracket 110 is hidden behind an outer surface of the outer panel 112 and forward of the outer panel 112. For use herein, "forward" references the front end of a vehicle 200.

The outer panel 112 includes an opening 114. The opening 114 is configured to receive a cup holder assembly 10. The cup holder assembly 10 includes a housing 12 and a cup holder 14. The housing 12 is formed by a pair of side walls 12a, a bottom wall 12b, a top wall 12c, and a back wall 12d so as to define a storage compartment 16 with a housing opening 12f. The storage compartment 16 is configured to hold the cup holder 14. The storage compartment 16 is disposed behind the outer panel 112.

For illustrative purposes the cup holder 14 is shown as being configured to house two cups in a side-by-side relationship. The cup holder 14 includes a pair of radially extending arms 18 and a leg 20 which is biased downwardly so as to hold a respective cup therein. The radially extending arms 18 are biased inwardly by a biasing member so as to enable the arms 18 to grip cups of different dimensions. The leg 20 is biased downwardly with respect to the arms 18 so as to deploy in a position to support the bottom of a cup when the cup holder 14 is extended from the storage compartment 16.

An eject mechanism 22 is disposed within the housing 12 and is configured to eject a cup holder 14 from the storage compartment 16 so as to expose the cup holder 14 for use.

Eject mechanisms 22 currently known and used in the art may be adaptable for use herein. For example the eject mechanism 22 may include a biasing member (not shown), and a latch (not shown). The biasing member continuously urges the cup holder 14 out of the storage compartment 16. The latch may engage a portion of the cup holder 14 so as to retain the cup holder 14 within the storage compartment 16. A push of the cup holder 14 into the storage compartment 16 disengages the cup holder 14 from the latch, allowing the biasing member to push the cup holder 14 out of the storage compartment 16 into a position ready to accept a cup. Pushing the cup holder 14 back into the storage compartment 16 positions the latch to reengage the cup holder 14, securing the cup holder 14 within the storage compartment 16.

The housing 12 may include a plurality of attachment structures 36. The attachment structure 36 is generally disposed adjacent the housing 12 opening 114. The attachment structure 36 is generally planar and includes openings through which a mechanical fastener 38 such as a screw may extend so as to secure the cup holder 14 to the outer panel 112 of the instrument panel assembly 100.

With reference again to FIG. 8, the cup holder assembly 10 may further include a mount 24. The mount 24 may include a pair of ramp shaped planar members 28 extending generally vertically from the top surface 26 of the housing 12. The mount 24 may be formed on an exposed surface of the top wall 12c.

The mount 24 may include a catch 30. The catch 30 has a C-shaped cross section 42, the back surface of the catch 30 attached to the ramped shaped planar members 28. The catch 30 is configured to engage an elongated portion 116 of an instrument panel reinforcement bracket 110 so as to limit the advancement of the cup holder 14 when mounted within the opening 114 of the outer panel 112 of the instrument panel assembly 100.

A distal end of the elongated portion 116 has a C-shaped in cross section 118 adapted to engage the inner surface 40 of the catch 30. The C-shaped in cross section 118 is complementary to the C-shaped cross section 42 of the catch 30 and is dimensioned to seat within the inner surface 40 of the catch 30 so as to form a mutually seating arrangement wherein a cantilevered action of the cup holder 14 is countered by the engagement of a bottom portion 116b of the elongated portion 116 with a bottom portion 30b of the catch 30 so as to help maintain the cup holder 14 along the horizontal plane.

The instrument panel assembly 100 may further include a liner 44. The liner 44 is configured to absorb noise, vibration, and torque and is pinched between an inner surface 40 of the catch 30 and an outer surface of the elongated member so as to reduce noise and vibration between the two parts.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A cup holder assembly disposed within an opening of an instrument panel assembly having a reinforcement bracket, the cup holder assembly comprising:
   a housing having a housing opening generally orthogonal to a top surface;
   a cup holder disposed within the housing, and slidable from a stored position to an extended position; and
   a mount disposed on the top surface of the housing, the mount having a catch configured to abut against the reinforcement bracket so as to limit the advancement of the cup holder assembly during installation of the cup holder assembly to the instrument panel.

2. The cup holder assembly as set forth in claim 1, further including an eject mechanism mechanically attached to the cup holder, the eject mechanism configured to extend the cup holder out of the storage compartment so as to expose the cup holders for use.

3. The cup holder assembly as set forth in claim 1, wherein the mount is a pair of ramp shaped planar members extending generally vertically from the top surface of the housing.

4. The cup holder assembly as set forth in claim 1, further including a sleeve, the sleeve is dimensioned to engage an outer surface of the housing, and wherein the mount is disposed on the portion of the sleeve disposed on the top surface of the housing.

5. The cup holder assembly as set forth in claim 1, wherein the catch includes an inner surface having a C-shaped cross section.

6. The cup holder assembly as set forth in claim 1, further including a liner, the liner mounted to an inner surface of the catch so as to be sandwiched between the catch and the reinforcement bracket.

* * * * *